(12) United States Patent
Buchecker et al.

(10) Patent No.: US 7,419,620 B2
(45) Date of Patent: Sep. 2, 2008

(54) DICHROIC MIXTURES

(75) Inventors: Richard Buchecker, Zurich (CH); Zoubair M. Cherkaoui, Allschwil (CH); Thomas Peglow, Lorrach (DE); Franco Moia, Frenkendorf (CH)

(73) Assignee: Rolic Ltd c/o Rolic Technologies Ltd, Zug (CH)

( * ) Notice: Subject to any disclaimer, the term of this patent is extended or adjusted under 35 U.S.C. 154(b) by 523 days.

(21) Appl. No.: 10/477,124

(22) PCT Filed: Jan. 28, 2002

(86) PCT No.: PCT/CH02/00044

§ 371 (c)(1), (2), (4) Date: Apr. 8, 2004

(87) PCT Pub. No.: WO02/090447

PCT Pub. Date: Nov. 14, 2002

(65) Prior Publication Data

US 2004/0164272 A1   Aug. 26, 2004

(30) Foreign Application Priority Data

May 8, 2001 (EP) .................................. 01810445

(51) Int. Cl.
*C09K 19/00* (2006.01)
*C09K 19/52* (2006.01)

(52) U.S. Cl. .............................. 252/299.01; 252/299.1; 252/299.2; 252/299.61; 252/299.62; 428/1.1; 430/20

(58) Field of Classification Search ............... 252/299.2, 252/299.01, 299.61, 299.1, 299.62; 428/1.1; 430/20
See application file for complete search history.

(56) References Cited

U.S. PATENT DOCUMENTS

| | | |
|---|---|---|
| 4,101,269 A | 7/1978 | Champenois |
| 4,943,617 A | 7/1990 | Etzbach et al. |
| 5,707,544 A | 1/1998 | Kelly |
| 6,007,745 A | 12/1999 | Coates et al. |
| 2006/0188663 A1* | 8/2006 | Peglow et al. ......... 252/299.01 |

FOREIGN PATENT DOCUMENTS

| | | |
|---|---|---|
| EP | 0 369 376 A2 | 5/1990 |
| EP | 0 799 864 A1 | 10/1997 |
| GB | 1006883 | 10/1965 |
| WO | 00/54111 | 9/2000 |

OTHER PUBLICATIONS

Database WPI, Section Ch, Week 199848, Derwent Publications Ltd., London, GB; Class A41, AN 1998-563355; XP002180180 & JP 10 251537 A (Menicon Co Ltd), Sep. 22, 1998 abstract.

* cited by examiner

*Primary Examiner*—Geraldina Visconti
(74) *Attorney, Agent, or Firm*—Sughrue Mion, PLLC

(57) ABSTRACT

A mesogenic, crosslinkable mixture comprising at least one polymerisable liquid crystal and at least one polymerisable dichroic dye of the general formula I:

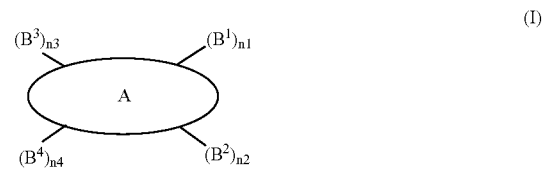

wherein

A represents a dichroic residue exhibiting at least partial absorption in the visible region >400 nm; n1, n2, n3, n4 signifies 0 or 1 whereby the sum of n1, n2, n3 and n4 is >0, and $B^1$ and $B^4$ represent a group of substructure II

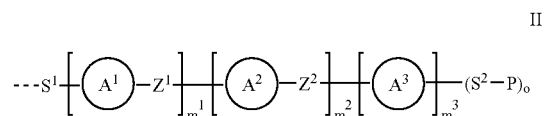

wherein the broken line symbolises the linkage to said dichroic residue.

51 Claims, No Drawings

DICHROIC MIXTURES

This application is the U.S. national stage filing under 35 U.S.C. § 371 of international application no. PCT/CH2002/00044, filed on Jan. 28, 2002, which claims the benefit of priority to European application no. 01810445.5, filed on May 8, 2001.

The present invention relates to a new mixture of crosslinkable liquid crystals and polymerisable dichroic dyes and their use in the construction of unstructured and structured polarisers.

Optical polarisers (hereinafter also called polarising films, polarisation films or polariser films) play a crucial role in the functioning principle of many optical or electro-optical devices, such as Liquid Crystal Devices, modern Security Elements, and the like. Furthermore, optical polarisers are also used in many instruments or devices, for example in different kinds of measuring instruments, dashboards or sunglasses, where stray light and undesired reflections have to be eliminated to improve visibility. Such polarising films usually comprise stretched polymer films such as, for example, polyvinyl alcohol (PVA), a dichroic absorber and other optional layers. Dichroic absorbers usually are iodine or dichroic dyes which are absorbed on or dissolved in the polymer film.

U.S. Pat. No. 5,707,544 describes liquid crystals characterised by a molecular architecture, wherein a chromophore is laterally attached to a polymerisable mesogenic core. Such compounds and liquid crystalline mixtures containing these are described to be useful mainly for non-linear optic devices or colour filters.

Yet, a disadvantage of the most widespread polariser films based on iodine absorbers is their limited stability against humidity, heat and light. Polariser films based on dichroic dyes have a tendency to lose efficiency during time due to diffusion processes or inhomogeneities caused by partial crystallisation. A further drawback is the migration of dichroic dyes to adjacent layers if such systems are designed for use in multilayer systems as e.g. described in EP-A-0689084. Thus, there is clearly a need for a concept whereby all or at least some of the above disadvantages may be avoided.

Applicants have now found that certain mixtures comprising liquid crystals and dichroic dyes may be able to overcome the disadvantages described hereinabove.

Thus, in a first aspect the present invention provides a mesogenic, crosslinkable mixture comprising at least one polymerisable liquid crystal and at least one polymerisable dichroic dye of the general formula I:

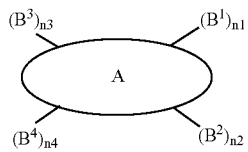

I wherein
A represents a dichroic residue exhibiting at least partial absorption in the visible region >400 nm;
n1, n2, n3, n4 signifies 0 or 1 whereby the sum of n1, n2, n3 and n4 is >0, and
$B^1$ to $B^4$ represent a group of substructure II

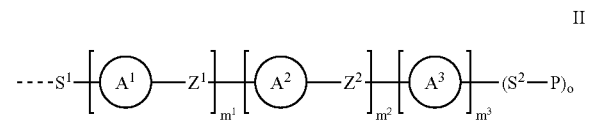

II wherein the broken line symbolises the linkage to said dichroic residue and wherein:
$A^1$, $A^2$, $A^3$ each independently represents an aromatic or alicyclic group, which is unsubstituted or substituted by fluorine, chlorine, cyano, nitro, or a straight-chain or branched alkyl residue, which is unsubstituted, mono-substituted by cyano or halogeno, or poly-substituted by halogeno, having 1 to 18 carbon atoms, and wherein one or more of the non-adjacent $CH_2$ groups may independently be replaced by Q, whereby Q represents —O—, —CO—, —CO—O—, —O—CO—, —Si($CH_3$)$_2$—O—Si($CH_3$)$_2$—, —$NR_2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, and $R^2$ represents hydrogen or lower alkyl;
$S^1$, $S^2$ represent a single covalent bond or a spacer unit, such as a straight-chain or branched alkylene residue, which is unsubstituted, mono-substituted by cyano or halogeno, or poly-substituted by halogeno, having 1 to 24 carbon atoms, wherein one or more of the non-adjacent $CH_2$ groups may independently be replaced by Q, wherein Q has the meaning given above;
$Z^1$, $Z^2$ independently represent a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent $CH_2$ groups may independently be replaced by Q, —N=N— or —$CR^2$=C—CO—, wherein Q and $R^2$ have the meaning given above;
P represents a polymerisable group;
m1, m2, m3 independently are 0 or 1; and
o is 0 or 1, whereby the sum of the symbols o in B1 to B4 is >0.

In a further aspect the invention also provides the use of said mesogenic crosslinkable mixtures for the production of dichroic crosslinked films as well as their use in the construction of unstructured and structured optical elements and multi-layer systems as for example, for colour filters, polarisers and for the construction of security devices.

These new polymerisable dichroic mixtures show good homogeneous alignment and upon crosslinking do not exhibit inhomogeneities or changes of the dichroitic ratio due to relaxation, diffusion or micro crystallisation processes over time.

The term "crosslinkable mixture" refers to a mixture comprising at least one compound that comprises more than one polymerisable group in its structure.

The term "dichroic residue" refers to a dichroic dye exhibiting positive or negative dichroism structurally reduced to the pure chromophore systems.

It is understood that the term "aromatic" includes optionally substituted carbocyclic and heterocyclic groups comprising five-, six- or ten-membered ring systems, such as furane, phenyl, pyridine, pyrimidine, naphthalene, or tetraline units.

It is understood that the term "alicyclic" includes non-aromatic carbocyclic or heterocyclic ring systems having 3 to 10 carbon atoms, such as cyclopropane, cyclobutane, cyclopentane, cyclopentene, cyclohexane, cyclohexene, cyclohexadiene and decaline.

It is understood that the phrase "cyclic, straight-chain or branched alkyl group, which is optionally substituted by a single cyano group or by one or more halogen atoms, and in which one or more of the non-adjacent —$CH_2$— groups may be optionally replaced by a group Q" includes groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but-3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent-4-enyloxycarbonyl, cylohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, decylcarbonyloxy, undecylcarbonyloxy, dodecylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, decylcarbonyl, undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl, 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy, and the like.

It is understood that the term "lower alkyl" includes straight chain and branched hydrocarbon radicals having 1 to 6 carbon atoms, preferably 1 to 3 carbon atoms. Methyl, ethyl, propyl and isopropyl groups are especially preferred.

Dichroic dyes, of which the dichroic residues A are derived from, are described in the literature, e.g. in Molecular Crystals, Liquid Crystals 150A, (1987). In a preferred embodiment the dichroic dyes of the present invention include azo dyes, anthraquinones, benzoquinones, perylenes, azulenes, and merocyanines. Particularly preferred dichroic dyes of the present invention include dyes comprising azo- or anthraquinone residues.

The sum of substituents B attached to a dichroic residue A expressed by ($n^1+n^2+n^3+n^4$) is preferably $\leqq 3$, more preferably $\leqq 2$.

Preferred rings $A^1$, $A^2$ and $A^3$ independently of each other are unsubstituted, saturated five- or six-membered alicyclic rings or six-membered aromatic rings, optionally substituted by fluorine or chlorine or nitro or by a straight chain or branched alkyl residue, which is unsubstituted, mono- or poly-substituted by fluorine having 1-12 carbon atoms, wherein one or more of the non-adjacent $CH_2$ groups may independently be replaced by —O—, —CO—O—, —O—CO—, —$NR^2$—CO—, —CO—$NR^2$—, —$NR^2$—CO—O—, —O—CO—$NR^2$—, —CH=CH—, —C≡C—, —O—CO—O—, wherein $R^2$ represents hydrogen or lower alkyl.

Particularly preferred rings $A^1$, $A^2$ and $A^3$ include unsubstituted cyclopentane-1,3-diyl, unsubstituted cyclohexane-1,4-diyl, or 1,4-phenylene, which is unsubstituted, mono- or poly-substituted by fluorine or chlorine or a straight-chain or branched alkyl residue, which is unsubstituted, mono- or poly-substituted by fluorine having 1-12 carbon atoms, wherein one or more of the non-adjacent $CH_2$ groups may independently be replaced by —O—, —CO—O—, —O—CO—, —CH=CH—, —C≡C—.

Preferred "spacer units" $S^1$ and $S^2$ of the present invention include a single bond, or a straight-chain or branched alkylene grouping, such as —$(CH_2)_r$—, and also —$(CH_2)_r$—O—, —$(CH_2)_r$—CO—, —$(CH_2)_r$—CO—O—, —$(CH_2)_r$—O—CO—, —$(CH_2)_r$—CO—$NR^2$—, —$(CH_2)_r$—$NR^2$—CO—, —$(CH_2)_r$—$NR^2$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^2$—CO—$(CH_2)_s$—O—, —$(CH_2)_r$—$NR^2$—CO—O—$(CH_2)_s$—O—, —O—$(CH_2)_r$—, —CO—O—$(CH_2)_r$—, —O—CO—$(CH_2)_r$—, —$NR^2$—CO—$(CH_2)_r$—, —CO—$NR^2$—$(CH_2)_r$—, —$NR^2$—$(CH_2)_r$—, —O—$(CH_2)_r$—CO—O—, —O—$(CH_2)_r$—O—CO—, —O—$(CH_2)_r$—CO—$NR^2$—, —O—$(CH_2)_r$—$NR^2$—, —O—$(CH_2)_r$—O—, —O—$(CH_2)_r$—$NR^2$—CO—, —$NR^2$—$(CH_2)_r$—CO—O—, —$NR^2$—$(CH_2)_r$—O—, —$NR^2$—$(CH_2)_r$—$NR^2$—, —$NR^2$—$(CH_2)_r$—O—CO—, —CO—$NR^2$—$(CH_2)_r$—O—, —CO—$NR^2$—$(CH_2)_r$—$NR^2$—, —CO—$NR^2$—$(CH_2)_r$—O—CO—, —O—CO—$(CH_2)_r$—CO—, —O—CO—$(CH_2)_r$—O—, —O—CO—$(CH_2)_r$—$NR^2$—, —O—CO—$(CH_2)_r$—CO—O—, —O—CO—$(CH_2)_r$—CO—$NR^2$—, —O—CO—$(CH_2)_r$—$NR^2$—CO—, —O—$(CH_2)_r$—O—$(CH_2)_s$—, —O—$(CH_2)_r$—$NR^2$—CO—, —O—$(CH_2)_r$—CO—O—$(CH_2)_s$—, —O—$(CH_2)_r$—$NR^2$—CO—$(CH_2)_s$—, —O—$(CH_2)_r$—$NR^2$—CO—O—$(CH_2)_s$—, —O—$(CH_2)_r$—CO—O—$(CH_2)_s$—O—, —O—$(CH_2)_r$—O—$(CH_2)_s$—O—, —O—$(CH_2)_r$—$NR^2$—CO—$(CH_2)_s$—O—, —O—$(CH_2)_r$—$NR^2$—CO—O—$(CH_2)_s$—O—, —CO—O—$(CH_2)_r$—O—$(CH_2)_s$—, —CO—O—$(CH_2)_r$—O—$(CH_2)_s$—O—, wherein r and s are each an integer from 1 to 20, the sum of $r+s \leqq 21$, wherein $R^2$ represents hydrogen or lower alkyl, and which are attached to the dichroic residue and the polymerisable group, respectively, such that heteroatoms are not directly linked to each other.

Particularly preferred "spacer units" $S^1$ include a single bond, a straight-chain alkylene grouping, such as —$(CH_2)_r$—, and also —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NH—CO—O—$(CH_2)_s$—O—, —O—$(CH_2)_r$—, —CO—O—$(CH_2)_r$—, —CO—NH—$(CH_2)_r$—, —O—CO—$(CH_2)_r$—, —O—CO—$(CH_2)_r$—CO—O—, —O—$(CH_2)_r$—O—

CO—, —O—(CH$_2$)$_r$—CO—NH—, —O—(CH$_2$)$_r$—NH—CO—, —CO—O(CH$_2$)$_r$—O—, —CO—NH—(CH$_2$)$_r$—O—, —O—(CH$_2$)$_r$—O—, —O—(CH$_2$)$_r$—NH—CO—(CH$_2$)$_s$—, —O—(CH$_2$)$_r$—O—(CH$_2$)$_s$—O—, —O—(CO—CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O—, —O—CO—(CH$_2$)$_r$—NH—CO—(CH$_2$)$_s$—O—, wherein r and s are each an integer from 1 to 16, the sum of r+s≦18 and which are attached to the dichroic residue and the polymerisable group, respectively, such that heteroatoms are not directly linked to each other.

Most preferred "spacer units" of S$^1$ include a single bond, a straight-chain alkylene grouping represented by —(CH$_2$)$_r$—, and also —(CH$_2$)$_r$—O—, —(CH$_2$)$_r$—CO—O—, —(CH$_2$)$_r$—O—CO—, —(CH$_2$)$_r$—O—(CH$_2$)$_s$—O—, —(CH$_2$)$_r$—NH—CO—O—(CH$_2$)$_s$—O—, and if attached to a carbon atom of the dichroic residue also —O—(CH$_2$)$_r$—, —CO—O—(CH$_2$)$_r$—, —O—CO—(CH$_2$)$_r$—, —O—CO(CH$_2$)$_r$—CO—O—, —O—(CH$_2$)$_r$—O—CO—, —CO—O—(CH$_2$)$_r$—O—, —O—(CH$_2$)$_r$—O—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, wherein r and s are each an integer from 1 to 12, the sum of r+s≦14, and which are attached to the dichroic residue and the polymerisable group, respectively, such that heteroatoms are not directly linked to each other.

Examples of preferred "spacer units" S$^1$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexyl, 6-(3-propyleneoxy)hexyl, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

Preferred Z$^1$ and Z$^2$ groups include a single covalent bond or a straight-chain or branched alkylene residue, which is unsubstituted, mono-substituted or poly-substituted by fluoro, having 1 to 8 carbon atoms, wherein one or more of the non-adjacent CH$_2$ groups may independently be replaced by —O—, —CO—, —CO—O—, —O—CO—, —NR$^2$—CO—, —CO—NR$^2$—, —NR$^2$—CO—O—, —O—CO—NR$^2$—, —CH═CH—, —C≡C—, —O—CO—O—, —N═N—, —CR$^2$═C—CO—, wherein R$^2$ represents hydrogen or lower alkyl.

Particularly preferred Z$^1$ and Z$^2$ groups include a single covalent bond or a straight-chain or branched alkylene residue, having 1 to 6 carbon atoms, wherein one or more of the non-adjacent CH$_2$ groups may independently be replaced by —O—, —CO—O—, —O—CO—, —CH═CH—, —C≡C—, —O—CO—O—, —N═N—, —CR$^2$═C—CO—, wherein R$^2$ represents hydrogen or lower alkyl.

Most preferred Z$^1$ and Z$^2$ groups include a single covalent bond or a straight-chain or branched alkylene residue, having 1 to 4 carbon atoms, wherein one or two of the non-adjacent CH$_2$ groups may independently be replaced by —O—, —CO—O—, —O—CO—, —N═N—.

Polymerisable groups P are preferably selected from the formulae CH$_2$═CW—, CH$_2$═CW—COO—, CH$_2$═CH—CO—NH—, CH$_2$═C(Ph)-CO—NH—, CH$_2$═CH—O—, CH$_2$═CH—OOC—, Ph-CH═CH—, CH$_2$═CH—Ph-, CH$_2$═CH—Ph-O—, R$^3$—Ph-CH═CH—COO—, R$^3$—OOC—CH═CH—Ph-O—, N-maleinimidyl, wherein W is hydrogen, chloro or methyl, R$^3$ is lower alkyl or lower alkoxy, Ph- is phenyl and —Ph- is 1,4-phenylene.

Particularly preferred groups P include CH$_2$═CW—, CH$_2$═CW—COO—, CH$_2$═CH—O— wherein W is hydrogen or methyl.

The number of rings in substructure II expressed by m$^1$+m$^2$+m$^3$ is preferably ≦2.

Polymerisable liquid crystals (LCP) which are present in the inventive mixtures are well known to the skilled person e.g. from EP 0331233, WO 95/24454, U.S. Pat. Nos. 5,567,349, 5,650,534, WO 00/04110, WO 00/07975, WO 00/48985, WO 00/55110 and WO 00/63154. For adjustment of mesomorphic properties and suppression of crystallisation, mixtures of two or more LCP components may generally be used. At least one of the LCP components may optionally comprise more than one polymerisable group in the chemical structure in order to achieve crosslinking. As an alternative or to improve crosslinking abilities the addition of isotropic compounds comprising two or more polymerisable groups, so called crosslinkers, may also be possible. Furthermore well known additives such as, e.g. phenol derivatives for stabilisation and photoinitiators such as, e.g. Irgacure® may also be present in the inventive mixture.

The number of dyes of formula I present in the mixture may depend mainly on the spectral working range of the polariser and on the solubility of the dyes. Coloured polarisers, which are absorbing in a selective spectral range may preferably be achieved by the presence of one or two, black polarisers, selectively absorbing in the whole visible range by the presence of three or more dyes in the mixture.

Preferred mixtures of the invention consequently comprise at least one dichroic dye according to the general formula I and at least two polymerisable liquid crystals, wherein at least one of them comprises more than one polymerisable group and optionally additives, such as crosslinkers, stabilisers and photoinitiators.

Particularly preferred are mixtures comprising one to four dichroic dyes of formula I and at least two polymerisable liquid crystals comprising each two polymerisable groups and optionally additives such as crosslinkers, stabilisers and photoinitiators.

The total content of dichroic dyes of formula I in the inventive mixture may depend on different factors such as solubility in the LCP host, influence on the mesomorphic properties (e.g. depression of clearing point) and absorption ability (extinction) of the dyes involved. Preferred dye concentrations may be in the range of 0.1 to 50% wt, more preferably from 0.5 to 30% wt , most preferably from 0.5 to 20% wt .

Dichroic dyes from the class of azo dyes suitable for the inventive mixtures may preferably be selected from the groups according to general formulae III-V:

$$R^4-Ar^1-N=N-Ar^2-B^1 \qquad \qquad III$$

$$R^4-Ar^1-N=N-Ar^2-N=N-Ar^3-B^1 \qquad \qquad IV$$

$$R^4-Ar^1-N=N-Ar^2-N=N-Ar^3-N=N-Ar^4-B^1 \qquad \qquad V$$

wherein $R^4$ represents hydrogen, fluoro, chloro, bromo, cyano, nitro, $-NR^2R^3$, a three- to seven-membered cyclic amino group, $-CR^2=CR^3-NO_2$, $-CR^2=CR^3-CN$, $-CR^2=C(CN)_2$, or a straight chain or branched alkyl residue, which is unsubstituted, mono- or poly-substituted by fluorine having 1-18 carbon atoms, wherein one or more of the non-adjacent $CH_2$ groups may independently be replaced by $-O-$, $-CO-O-$, $-O-CO-$, $-NR^2-CO-$, $-CO-NR^2-$, $-NR^2-CO-O-$, $-O-CO-NR^2-$, $-CH=CH-$, $-C\equiv C-$, $-O-CO-O-$, wherein $R^2$ and $R^3$ independently represent hydrogen or lower alkyl;

$Ar^1$, $Ar^2$, $Ar^3$, $Ar^4$ independently of each other are 1,4-phenylene, 1,4- or 1,5-naphthylene optionally substituted by fluorine, chlorine, hydroxy, $-NR^2R^3$ or by a straight chain or branched alkyl residue, which is unsubstituted, mono- or poly-substituted by fluorine having 1-12 carbon atoms, wherein one or more of the non-adjacent $CH_2$ groups may independently be replaced by $-O-$, $-CO-O-$, $-O-CO-$, $-NR^2-CO-$, $-CO-NR^2-$, $-NR^2-CO-O-$, $-O-CO-NR^2-$, $-CH=CH-$, $-C\equiv C-$, $-O-CO-O-$, wherein $R^2$ and $R^3$ independently represent hydrogen or lower alkyl; and wherein $Ar^1$ is also a group of formula a) to c)

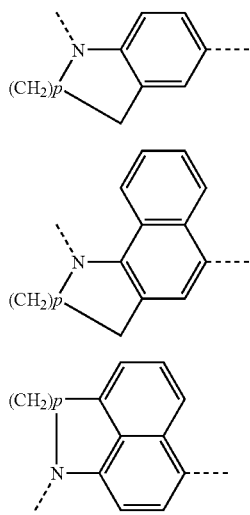

a)

b)

c)

wherein p is an integer of 1 to 3 and $R^4$ of formulae III to V is attached to the nitrogen atom; and $B^1$ has the meaning given above.

The dyes of formula III to V are new and represent a further aspect of the present invention.

Preferred dyes of formula III to V include those wherein $R^4$ represents hydrogen, chloro, cyano, nitro, $-NR^2R^3$, 1-piperidyl-1-pyrrolidyl or a straight chain or branched alkyl residue, which is unsubstituted, having 1-12 carbon atoms, wherein one or two of the non-adjacent $CH_2$ groups may independently be replaced by $-O-$, $-CO-O-$, $-O-CO-$, $-CH=CH-$, wherein $R^2$ and $R^3$ independently represent hydrogen or lower alkyl;

Preferred dyes of formula III to V include also those where $Ar^1$ to $Ar^4$ independently of each other are 1,4-phenylene or 1,4-naphthylene optionally substituted by chlorine, hydroxy, $-NR^2R^3$ or by a straight chain or branched alkyl residue, which is unsubstituted, having 1-12 carbon atoms, wherein one or two of the non-adjacent $CH_2$ groups may independently be replaced by $-O-$, $-CO-O-$, $-O-CO-$, $-CH=CH-$, wherein $R^2$ and $R^3$ independently represent hydrogen or lower alkyl; and wherein $Ar^1$ additionally is a group of formula a) to c).

Preferred azo dyes of formula III may comprise no 1,4-naphtylene units, preferred azo dyes of formula IV at most one 1,4-naphthylene unit, and preferred azo dyes of formula V not more than two 1,4-naphthylene units.

Dichroic dyes from the class of anthraquinones suitable for the mixtures of the present invention may preferably be selected from the groups according to formulae VI-X:

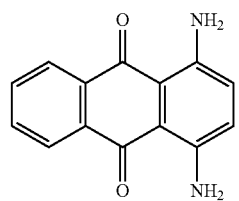

VI

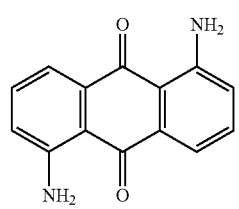

VII

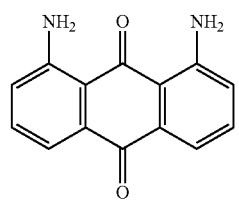

VIII

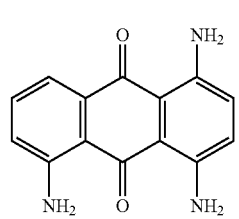

IX

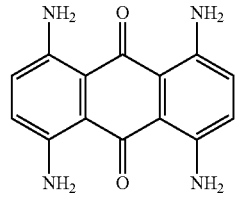

X wherein one to four hydrogen atoms are substituted by the groups of $B^1$ to B4 either at carbon or nitrogen atoms, and wherein $B^1$ to $B^4$ have the meaning given above, with the provision that at most one of $B^1$ to $B^4$ is attached to the same nitrogen atom.

Such anthraquinone dyes are new and represent a further aspect of the present invention.

Preferred anthraquinone dyes may comprise one or two of the groups $B^1$ to $B^4$. Further preferred anthraquinone dyes may be represented by the formulae VI, VII or X.

The dichroic azo dyes of formula III to V and the dichroic anthraquinone dyes based on formulae VI to X may readily be prepared using methods well known to the person skilled in the art, such as those documented in Houben-Weyl, *Methoden der Organischen Chemie*, Thieme-Verlag, Stuttgart or in *Molecular Crystals and Liquid Crystals* Vol. 150A, 1987.

The polymerisable liquid crystalline mixtures according to the present invention may further be formed into liquid crystalline polymer films (LCP films). Thus, in a further aspect the invention provides dichroic films formed from mixtures according to the present invention. Such LCP films may readily be prepared by UV or thermal polymerisation of the mixtures of the present invention. A film comprising a mixture according to the present invention is formed on a substrate, for example, by first preparing a solution of a mixture, which is subsequently applied to a support by different coating techniques, such as spincoating, miniscuscoating, wirecoating, slotcoating, offsetprinting, flexoprinting, gravureprinting. After evaporation of the solvent the obtained film is polymerised using UV light to give a cross-linked dichroic liquid crystal film of preferably 0.5 to 5 μm thickness. If required such films may further be coated with other layers, such as, e.g. protective layers for protection against oxygen, UV-irradiation or mechanical stress. Such films may be used in the manufacture of devices such as polarisers or optical filters.

Examples of substrates used in the preparation of dichroic LCP films may include transparent substrates, such as glass or plastic including an orientation layer, which is able to induce a uniform orientation to the mixture. Such orientation layers may include rubbed polyimide, or polyamide or preferably layers of photo-orientable materials. A well-suited kind of photo-orientable orientation layers are Linearly Photopolymerisable Polymers (LPP), also sometimes referred to as Photoooriented Polymer Networks (PPN). Backgrounds and manufacturing of such orientation layers are disclosed in, for example, U.S. Pat. Nos. 5,389,698, 5,838,407, 5,602,661, 6,160,597, 6,144,428, all of the applicant. Using LPP layers, segments (pixels) of locally varying orientation may be formed. Thus, not only uniformly aligned dichroic LCP layers but also structured complex orientation patterns within the dichroic LCP layers may be produced. Furthermore multilayer systems formed from stacks of alternating LPP and LCP layers, wherein at least one of the LCP layers is a dichroic LCP layer are feasible. Such layers or stacks of layers may additionally be covered by other well known functional layers, such as, e.g. protecting layers against oxygen or humidity or layers for protection against ultraviolet radiation.

Recently it has been shown, e.g. in WO 99/64924, that photo-orienting materials like LPPs may also be able to orient liquid crystals, such as LCPs, if they are admixed to the mixture to be oriented prior to illumination with polarised light. In this way, orientation layers and LCP layers need not be formed separately. Thus, an analogous preparation of a dichroic LCP film using an inventive mixture, which in addition contains a photo-orientable material, may also be possible.

The dichroic mixtures and films of the present invention may be used to prepare electro-optical and optical devices including security devices. A further aspect of the invention therefore provides an electro-optical or optical component or a security device comprising a dichroic liquid crystalline polymer film formed from a mixture of the invention. Examples of optical or electro-optical components may include structured or unstructured optical filters, polarisers or elements of security devices.

The following non-limiting examples further describe the present invention. Variations on these falling within the scope of the invention will be apparent to a person skilled in the art.

EXAMPLE 1

Preparation of 4-(6-Acryloyloxyhexyloxy)phenyl-1,4diaminoanthraquinone-2-carboxylate

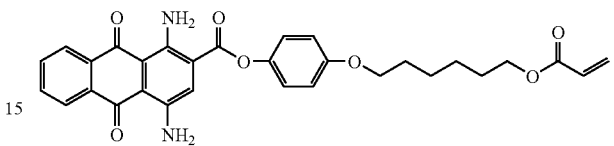

To a mixture of 0.16 g of 4-(6-acryloyloxyhexyloxy)phenyl-1-amino-4-nitroanthraquinone-2-carboxylate, 16 ml of dimethylformamide, and 2 ml of water was added at room temperature 0.465 g of iron-III-chloride and 0.281 g of zinc powder. The reduction was allowed to proceed for 15 h under continuous stirring. Then the reaction mixture was extracted with methylenechloride, the organic phases were collected and washed with water, dried over sodium sulphate, filtered and concentrated to dryness. Chromatography of the residue on silica using 5% ethylacetate in toluene and subsequent crystallisation from ethyl acetate/hexane (1:2) gave 0.12 g of blue crystals; $\lambda_{max}$. ($CH_2Cl_2$): 624 nm ($\epsilon$=10'100), 590 nm ($\epsilon$=10'133).

The starting material was prepared in accordance with the following procedure:

Preparation of 4-(6-Acryloyloxyhexyloxy)phenyl-1-amino-4-nitroanthraquinone-2-carboxylate To a mixture of 0.43 g of 4-(6-hydroxyhexyloxy)phenyl-1-amino-4-nitroanthraquinone-2-carboxylate, 20 ml of methylenechloride, 0.015 g of N,N-dimethylaminopyridine, and 0.117 ml of acrylic acid were added dropwise 0.246 g of dicyclohexylcarbodiimide in 10 ml of methylenechloride. The mixture was stirred for 15 h at room temperature, then filtered and the solution concentrated to dryness. Chromatography of the residue on silica, using 2.5% ethylacetate in toluene and crystallisation from ethylacetate/hexane (2:1) gave 0.16 g of red crystals; $\lambda_{max.}$ ($CH_2Cl_2$): 482 nm ($\epsilon$=7,647).

Preparation of 4-(6-Hydroxyhexyloxy)phenyl-1-amino-4-nitroanthraquinone-2-carboxylate A mixture of 0.9 g of 4-(6-(2-tetrahydropyranyl)oxyhexyloxy)phenyl-1-amino-4-nitroanthraquinone-2-carboxylate, 40 ml of methanol and 20 ml of 2N hydrochloric acid was stirred for 15 h at room temperature. The reaction mixture was then extracted with ether and the organic phase was washed with sodium bicarbonate and water and dried over sodium sulphate. Subsequent filtration and concentration to dryness gave 0.43 g of a red solid.

Preparation of 4-(6-(2-Tetrahydropyranyl)oxyhexyloxy)phenyl-1-amino-4-nitroanthraquinone-2-carboxylate To a mixture of 0.8 g of 1-amino-4-nitroanthraquinone-2-carboxylic acid (commercially available from Bayer), 0.904 g of 4-(6-(2-tetrahydropyranyl)oxyhexyloxy)phenol, 30 ml of methylenechloride and 0.044 g of N,N-dimethylaminopyridine was added dropwise at 15° C. 0.74 g of dicyclohexylcarbodiimide in 15 ml of methylenechloride. The reaction mixture was then stirred for 15 h at room temperature. Subsequent filtration and concentration to dryness gave 0.9 g of the product as a red solid.

Preparation of
4-(6-(2-Tetrahydropyranyl)oxyhexyloxy)phenol

A mixture of 10 g of 2-(6-chlorohexyloxy)tetrahydropyrane, 25 g of hydroquinone, 31 g of potassiumcarbonate, 0.752 g of potassiumiodide and 250 ml of dimethylsulfoxide was allowed to react for 4 days at 80° C. Subsequently, the reaction mixture was cooled to room temperature and after addition of water extracted with ether. The organic phase was then dried over sodium sulphate, filtered and concentrated to dryness. Chromatography on silica with 10% ethylacetate in toluene gave 11 g of product as a yellowish oil.

Preparation of
2-(6-Chlorohexyloxy)tetrahydropyrane

To a mixture of 15 g of 6-chlorohexanol, 100 ml of methylenechloride and 0.2 g of p-toluenesulphonic acid were added dropwise 12 g of dihydropyrane in 40 ml of methylenechloride. The reaction mixture was stirred for 15 h at room temperature and then distributed between ether and saturated sodium bicarbonate solution. The ether phase was washed with water, dried over sodium sulphate, filtered and concentrated to dryness. Chromatography of the residue on silica using hexane/ether (3:1) gave 21 g of the product as a colourless oil.

The following compounds were synthesised using a similar method as described above:

4-(4-(6-Acryloyloxyhexyloxy)phenyloxycarbonyl)phenyl-1,4-diaminoanthraquinone-2-carboxylate

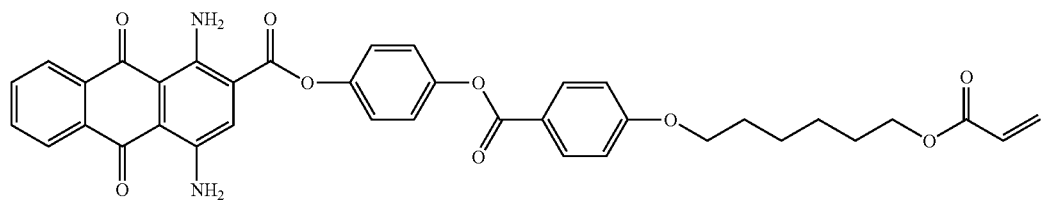

$\lambda_{max.}$ (CH$_2$Cl$_2$): 625 nm ($\epsilon$=12'995), 599 nm ($\epsilon$=12'900).

6-(4-(4-(6-Acryloyloxyhexyloxy)phenyloxycarbonyl)phenyloxy)hexyl-1,4-diaminoanthraquinone-2-carboxylate

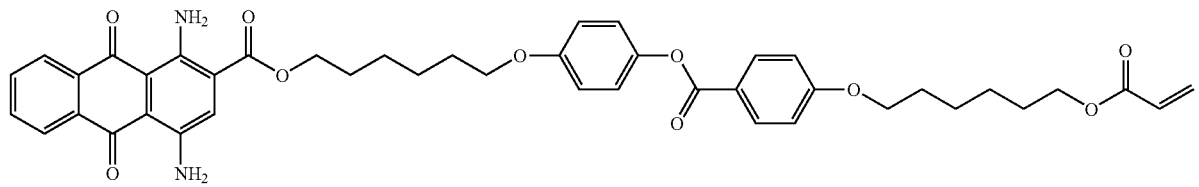

$\lambda_{max.}$ (CH$_2$Cl$_2$): 624 nm ($\epsilon$=11'306), 590 nm ($\epsilon$=11'404).

6-Acryloyloxyhexyloxy-1,4-diaminoanthraquinone-2-carboxylate

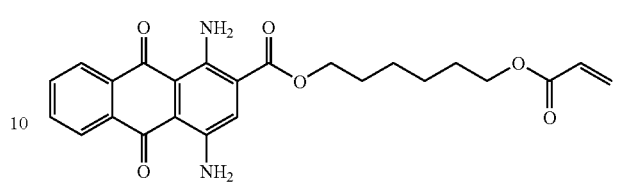

$\lambda_{max.}$ (CH$_2$Cl$_2$): 624 nm ($\epsilon$=11'921), 591 nm ($\epsilon$=11'789).

EXAMPLE 2

Preparation of (4-heptylphenyl)-4-acrylamido-1-aminoanthraquinone-2-carboxylate

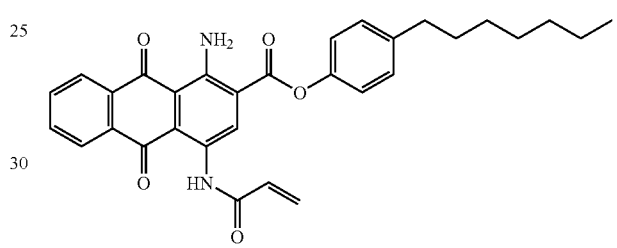

To a stirred solution of 0.91 g of (4-heptylphenyl)-1,4-diaminoanthraquinone-2-carboxylate (preparation analogous to example 1) in 80 ml of methylenechloride, cooled to 0° C. was added dropwise (over a period of 30 min) a solution of 0.36 g of acryloylchloride in 20 ml of methylenechloride. After stirring for 1 h at 0° C. and 30 min at room temperature, DMAP was added and stirring was continued for further 60 min. The reaction mixture was then concentrated to half its volume and passed through a silica gel column using methylenechloride as the eluent. The afforded violet solid was further recrystallised from ethanol/methylenechloride 9/1 (v/v) to give 0.88 g (4-heptylphenyl)-4-acrylamido-1-aminoanthraquinone-2-carboxylate as violet crystals; $\lambda_{max.}$ (CB 483): 572 nm.

EXAMPLE 3

Preparation of 1,4-di-N-[4-(6-Acryloyloxyhexyloxy)benzyl]aminoanthraquinone

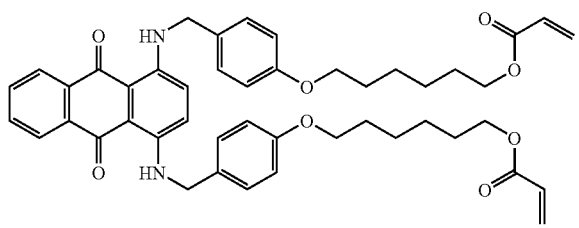

A mixture consisting of 4.8 g of 4-(6-acryloyloxyhexyloxy)benzylbromide, 0.48 g of 1,4-diaminoanthraquinone and 1.38 g of potassium carbonate in 20 ml of DMF was stirred under nitrogen atmosphere for 6 h at room temperature. The reaction mixture was then quenched with 100 ml 3 N HCl and extracted with ethylacetate (2×150 ml). The combined organic extracts were washed with saturated NaCl solution (100 ml), dried over sodium sulphate and concentrated to dryness to give a blue residue. Chromatography on silica using 5% diethylether with methylenechloride gave 0.9 g of pure 1,4-di-N-[4-(6-acryloyloxyhexyloxy)benzyl]aminoanthraquinone as blue crystals; $\lambda_{max.}$ (CB 483): 604 nm.

The starting material was synthesised according to the following procedure:

4-(6-Acryloyloxyhexyloxy)benzylbromide

To an ice-bath cooled solution of 5.0 g of 4-(6-acryloyloxyhexyloxy)benzylalcohol in 50 ml of methylenechloride was added dropwise a solution of 3.27 g of phosphorus tribromide in 10 ml of methylenechloride. After complete addition, the reaction mixture was stirred for further 15 min at about 5° C. and then poured into 100 g of ice water. The organic layer was separated, diluted with 50 ml of methylenechloride, washed with half saturated NaCl solution (3×60 ml), dried under reduced pressure and concentrated to dryness to give 4.8 g of a yellowish oil mainly consisting of 4-(6-acryloyloxyhexyloxy)benzylbromide. This oil was used without further purification in the next reaction step.

4-(6-Acryloyloxyhexyloxy)benzylalcohol

A mixture consisting of 2.48 g of 4-hydroxybenzylalcohol, 5.64 g of 6-iodohexyl acrylate, and 2.76 g of potassium carbonate in 50 ml of DMF was stirred under nitrogen atmosphere for 3 h at 60° C. After being cooled to room temperature the reaction mixture was quenched with 100 ml 3N HCl and extracted with diethylether (2×100 ml). The combined ether extracts were washed with saturated NaCl solution, dried over sodium sulphate and concentrated to dryness to give 5.3 g of nearly pure 4-(6-acryloyloxyhexyloxy)benzylalcohol as a beige heavy oil.

EXAMPLE 4

Preparation of 1,4-di-N-[2-(4-(6-Methacryloyloxyhexyloxy)phenylcarbonyloxy)-benzyl]aminoanthraquinone

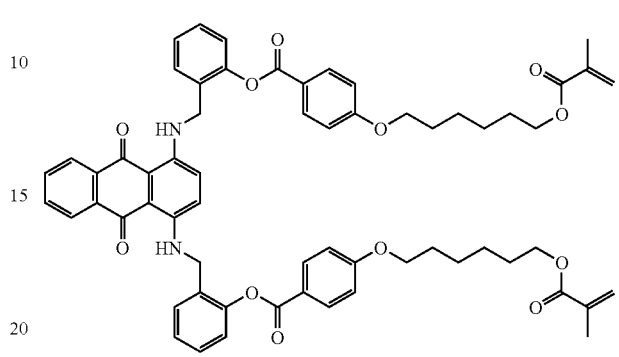

A mixture consisting of 4.3 g of 2-[4-(6-methacryloyloxyhexyloxy)-phenylcarbonyloxy]benzylbromide, 0.42 g of 1,4-diaminoanthraquinone and 1.38 g of potassium carbonate in 20 ml of DMF was stirred under nitrogen atmosphere for 6 h at room temperature. The reaction mixture was then quenched with 100 ml 3N HCl and extracted with ethylacetate (2×150 ml). The combined organic extracts were washed with saturated NaCl solution (100 ml), dried over sodium sulphate and concentrated to dryness to give a blue residue. Chromatography on silica using 5% diethylether in methylenechloride gave 0.7 g of nearly pure 1,4-di-N-[4-(6-acryloyloxyhexyloxy)benzyl]aminoanthraquinone as a blue crystalline material which was further recrystallised from 9/1 (v/v) ethanol/acetone; $\lambda_{max.}$ (CB 483): 611 nm.

The starting material was synthesised according to the following procedure:

2-[4-(6-Methacryloyloxyhexyloxy)phenylcarbonyloxy]benzylbromide

To an ice-bath cooled solution of 5.0 g of 2-[4-(6-methacryloyloxyhexyloxy)-phenylcarbonyloxy]benzylbromide in 50 ml of methylenechloride was added dropwise a solution of 2.80 g of phosphorus tribromide in 10 ml of methylenechloride. After complete addition, the reaction mixture was stirred for further 15 min at about 5° C. then poured into 100 g of ice water. The organic layer was separated off, diluted with 50 ml of methylenechloride, washed with half saturated NaCl solution (3×60 ml), dried over sodium sulphate and concentrated to dryness to give 4.3 g of a yellowish oily material mainly consisting of 2-[4-(6-methacryloyloxyhexyloxy)-phenylcarbonyloxy]benzylbromide. This oil was used without farther purification in the next reaction step.

2-[4-(6-Methacryloyloxyhexyloxy)phenylcarbonyloxy]benzylalcohol

To an ice-cooled solution of 2.44 g of salysaldehyde, 6.14 g of 4-(6-methacryloyloxyhexyloxy)benzoic acid and 0.24 g of N,N-dimethylaminopyridine in 30 ml of methylenechloride was added dropwise a solution of 4.12 g of dicyclohexylcarbodiimide in 10 ml of methylenechloride. After complete addition the mixture was further stirred for 3 h at room temperature, then filtered and the solution concentrated to dryness. The obtained yellowish oily residue was dissolved in 30 ml of ethanol containing 0.5 ml of water and the so obtained solution was cooled at 0° C., followed by slow addition of 0.37 g of sodium borohydride. The mixture obtained after complete addition was stirred for 15 min at 0° C., and subsequently for 30 min at room temperature. The resulting mixture was then quenched by adding 100 ml of water followed by extraction with ether (2×150 ml). The combined ether extracts were washed with half saturated ammonium chloride solution, dried over sodium sulphate and concentrated to dryness to give an oily residue. Subsequent purification by simple filtration through a short silica-gel column using ether as the eluent gave 5.2 g of pure 2-[4-(6-methacryloyloxy-hexyloxy)phenylcarbonyloxy]-benzylalcohol as a beige heavy oil.

The following compound was synthesised using a similar method:

1,4-di-N -[2-(4-(6-Acryloyloxyhexyloxy)phenylcarbonyloxy)-5-nitrobenzyl]amino-anthraquinone

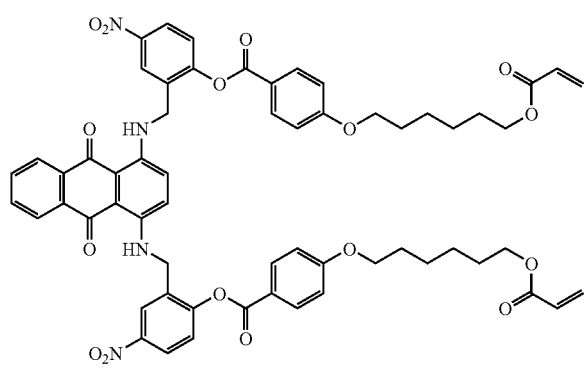

$\lambda_{max.}$ (CB 483): 639 nm

EXAMPLE 5

Preparation of 4-(4-Acryloyloxybutyloxy)-3-methyl-4'-phenylazo-azobenzene

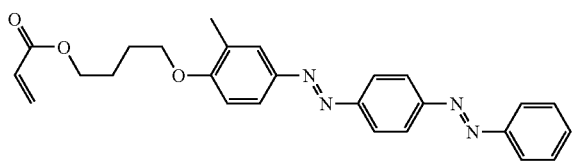

To a solution of 0.63 g of 4-hydroxy-3-methyl4'-phenylazo-azobenzene, 1.05 g of triphenylphosphine and 0.58 g of 4-hydroxybutylacrylate in 10 ml THF; which was cooled to −30° C., was added dropwise a solution of 0.70 g of diethyl azodicarboxylate in 5 ml THF. After complete addition, the reaction mixture was stirred for further 45 min at room temperature, and then concentrated to dryness. The obtained yellow-red residue was purified by filtration on silica using methylenechloride as the eluent to give 0.65 g of pure yellow-orange crystalys; $\lambda_{max.}$ (CB 483): 395 nm.

EXAMPLE 6

Preparation of 1-[4-(4(dimethylamino)naphthylazo)phenylazo]-4-(6-acryloyloxy-hexyloxy)naphtalene

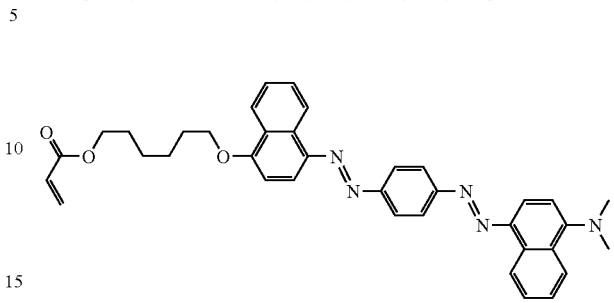

A mixture consisting of 0.44 g of 1-[4-(4-(dimethylamino)naphthylazo)phenylazo]-4-hydroxy-naphtalene, 0.56 g of 6-iodohexyl acrylate, and 0.28 g of potassium carbonate in 10 ml of DMF was stirred under nitrogen atmosphere for 3 h at 60° C. After cooling to room temperature the reaction mixture was quenched with 100 ml 3N HCl and the resulting precipitate was filtered off, washed with water (100 ml) and ethanol (50 ml) to give 0.5 g of pure 1-[4-(4-(dimethylamino)naphthylazo)-phenylazo]-4-(6-acryloyloxyhexyloxy)naphtalene as a brownish powder; $\lambda_{max.}$ (CB 483): 504 nm.

The starting material was synthesised according to the following procedure:

1-[4-(4-(Dimethylamino)-naphthylazo)-phenylazo]-4-hydroxy-naphtalene 2.9 g of 1-(4-amino-phenylazo)-4-(dimethylamino)naphtalene were dissolved in a mixture of 2.5 ml of HCl 37% and 5 ml of water. The obtained solution was cooled to 0° C., followed by dropwise addition of 0.69 g of sodium nitrite in 3 ml of water, while keeping the reaction temperature below 4° C. After complete addition, stirring was continued for 45 min at about 4° C. and the obtained mixture was then added to an ice-cooled solution of 1.44 g of 1-naphtol in NaOH/water (1.1 g/11 ml, while keeping the reaction temperature below 5° C. After complete addition, the reaction mixture was further stirred for 1 h at about 5° C. and then poured into 100 ml of water. The resulting brownish precipitate was filtered off, washed with water (100 ml) and methanol (50 ml). Crystallisation in methanol gave 3.3 g of the desired product.

1-(4-Amino-phenylazo)-4-(dimethylamino)-naphtalene

A mixture of 15 g of 1-(4-nitro-phenylazo)-4-(dimethylamino)naphtalene, 75 ml sodiumhydrogen sulphate nonahydrate (50% wt in water) and 80 ml of methanol was heated at reflux for 3 h. The reaction mixture was then cooled to room temperature and poured into 300 ml of water. The brownish precipitate was filtered off, washed with water (200 ml) and cold methanol-water (100 ml/100 ml) to give 12 g of nearly pure 1-(4-amino-phenylazo)-4-(dimethylamino)naphtalene as a brownish solid.

1-(4-Nitro-phenylazo)-4-(dimethylamino)naphtalene 6.91 g of 4-nitroaniline were dissolved in a mixture of 15 ml of HCl 37% and 40 ml of water. The obtained solution was cooled to 0° C., followed by dropwise addition of 3.45 g of sodium nitrite in 15 ml of water, while keeping the reaction temperature below 4° C. After complete addition, stirring was continued for 15 min at about 4° C. and the resulting mixture was then added to an ice-cooled solution of 8.56 g of 1-(dimethylamino)naphatalene in 20 ml of acetic acid. The reaction mixture was stirred for 30 min, followed by dropwise addition of 18 g of a solution of potassium acetate in 30 ml of water, while keeping the reaction temperature below 5° C. After complete addition the reaction mixture was further stirred for 1 h at room temperature and then poured into 300 ml of water. The brownish precipitate was filtered off, washed with water (300 ml) and with methanol (100 ml) and crystallised from methanol to give 15.3 g of the desired product.

EXAMPLES 7-11

Preparation of dichroic mixtures

Five mixtures were prepared using the dichroic, polymerisable, blue antraquinone dye B1 and the red, polymerisable, azo dye R1 shown in Table 1 and the monomeric, crosslinkable liquid crystal components (LCPs) Mon1 to Mon5 shown in Table 2.

TABLE 1

Dichroic dyes

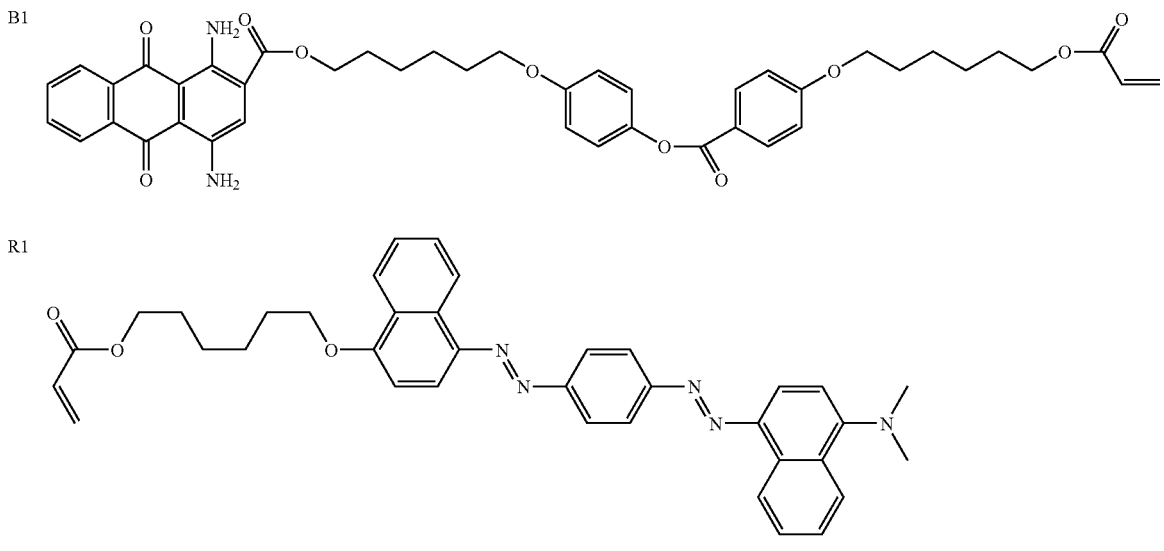

TABLE 2

LCP components

Mon1

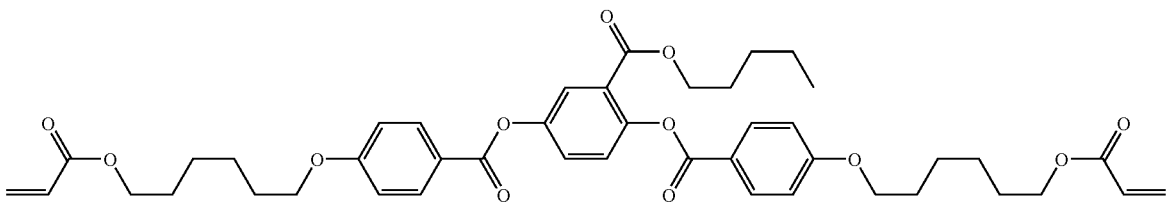

Mon2

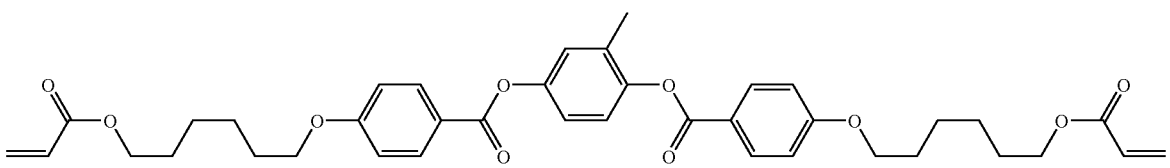

Mon3

TABLE 2-continued

LCP components

Mon4

Mon5

Using these crosslinkable liquid crystal monomers and polymerisable dichroic dyes, supercoolable dichroic nematic mixtures $M_{LCP1}$ to $M_{LCP5}$ were developed, allowing the preparation of LCP layers at room temperature. The composition ratios of the mixtures $M_{LCP1}$ to $M_{LCP5}$ were chosen as given in Table 3.

For the production of an LPP orientation layer, suitable LPP materials are described for example in patent publications EP 0 611 786, WO 96/10049 and EP 0 763 552, and include cinnamic acid derivatives and ferulic acid derivatives. For the examples, the following LPP material was chosen:

TABLE 3

Mixture compositions

| $M_{LCP1}$: | | $M_{LCP2}$: | | $M_{LCP3}$: | | $M_{LCP4}$: | | $M_{LCP5}$: | |
|---|---|---|---|---|---|---|---|---|---|
| B1 | 3.85 wt % | R1 | 3.85 wt % | B1 | 5.58 wt % | B1 | 3.85 wt % | R1 | 3.85 wt % |
| Mon1 | 76.92 wt % | Mon1 | 76.92 wt % | R1 | 1.40 wt % | Mon4 | 96.15 wt % | Mon5 | 96.15 wt % |
| Mon2 | 14.42 wt % | Mon2 | 14.42 wt % | Mon1 | 74.42 wt % | | | | |
| Mon3 | 4.81 wt % | Mon3 | 4.81 wt % | Mon2 | 13.95 wt % | | | | |
| | | | | Mon3 | 4.65 wt % | | | | | wt % = weight %

In addition, a further 2 wt % of the photo-initiator IRGA-CURE369 (Ciba) was added to the above mixtures.

The mixtures $M_{LCP1}$ to $M_{LCP5}$ were used to produce oriented, dichroic liquid crystal samples on glass substrates as described below.

Production of Dichroic LCP layers:

Five samples were prepared, whereby each single specimen comprised an alignment layer and a dichroic liquid crystal polymer layer. The alignment layers were manufactured using the linearly photo-polymerizable aligning (LPP) technique. The dichroic liquid crystal polymer layers were oriented by the adjacent LPP layers. The manufacturing processes of both layers are described in the following.

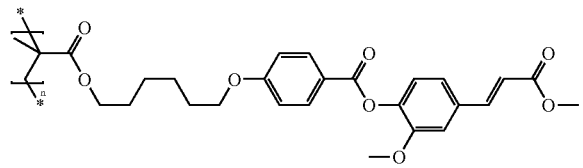

A 2% solution of the LPP material in methylpropylketone (MPK) as a solvent was spin-coated at 2000 rpm for 60 seconds at room temperature (20° C.). The layer was then dried for 5 to 10 minutes at 130 to 150° C. on a hot stage. Subsequently, the layer was exposed to linearly polarised light from a mercury high-pressure lamp for 10 to 550 seconds (depending on the strength of the lamp and on the characteristics of LPP and dichroic LCP layers) at room temperature. The layer was then used as an orientation layer for a liquid crystal material comprising dichroic dyes.

For the production of the dichroic LCP layers, the mixtures $M_{LCP1}$ to $M_{LCP5}$ were dissolved in anisole to give a 20 wt % solution. These LCP mixtures, which include dichroic dyes, were then spin-coated at 800 rpm for 60 seconds on top of the photo-exposed LPP layers. The spin-coated dichroic LCP layers were then dried at 60° C. for approximately 1 minute on a hot stage. For photo-initiated cross-linking of the liquid crystals and dye components, the layers were exposed to isotropic light from a xenon lamp for about 5 minutes (depending on the strength of the lamp) in an inert atmosphere.

The procedure described above gave photo-aligned dichroic LCP layers on glass substrates leading to 5 different samples $E_1$ to $E_5$ derived from the 5 dichroic LCP mixtures $M_{LCP1}$ to $M_{LCP5}$.

Order parameters of samples $E_1$ to $E_5$:

The order parameter S of a dichroic dye is given by the following expression:

$$S = D_\| - D_\perp / D_\| + 2 D_\perp$$

wherein $D_\|$ and $D_\perp$ are the optical densities of a dichroic dye in a liquid crystal measured for light polarisations parallel and perpendicular to the liquid crystal director.

Table 4 shows the order parameters S of samples $E_1$ to $E_5$ as measured at the indicated wavelength.

TABLE 4

| Sample | Dye B1 | Dye R1 | Dyes B1 + R1 |
|---|---|---|---|
| $E_1$ | S = 0.48 at λ = 639 nm | — | — |
| $E_2$ | — | S = 0.57 at λ = 499 nm | — |
| $E_3$ | — | — | S = 0.55 at λ = 493 nm |
| $E_4$ | S = 0.65 at λ = 642 nm | — | — |
| $E_5$ | — | S = 0.75 at λ = 507 nm | — |

All samples $E_1$ to $E_5$ were crosslinked successfully. The surfaces were completely dry and were more or less resistant against scratches.

What is claimed is:

1. A mesogenic, crosslinkable mixture, wherein at least one compound comprises more than one polymerisable group in its structure, and which mixture comprises at least one polymerisable liquid crystal comprising more than one polymerisable group, and at least one polymerisable dichroic dye selected from an anthraquinone of the formulae VI-X:

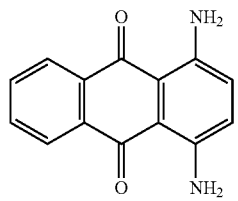

VI

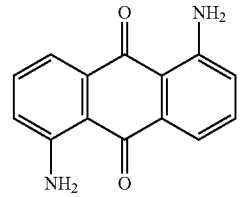

VII

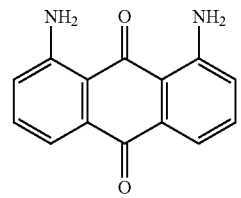

VIII

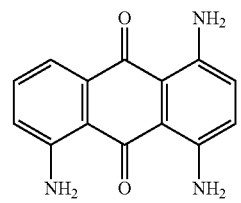

IX

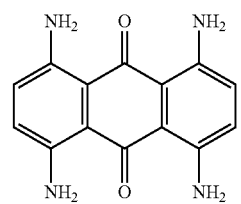

X wherein one to four hydrogen atoms are substituted by $B^1$ to $B^4$ either at carbon or nitrogen atoms, with the provision that at most one of $B^1$ to $B^4$ is attached to the same nitrogen atom, and wherein $B^1$ to $B^4$ represent a group of substructure II

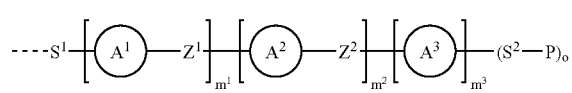

II wherein the broken line symbolizes the linkage to a dichroic residue and wherein:

$A^1$, $A^2$, $A^3$, each independently represent an aromatic or alicyclic group, which is unsubstituted or substituted by fluorine, chlorine, cyano, nitro, or a straight-chain or branched alkyl residue, which is unsubstituted, mono-substituted by cyano or halogeno, or poly-substituted by halogeno, having 1 to 18 carbon atoms, and wherein one or more of the non-adjacent $CH_2$ groups may independently be replaced by Q, whereby Q represents —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, and $R^2$ represents hydrogen or straight-chain or branched $C_1$-$C_6$ alkyl;

S¹, S² represent a single covalent bond or a spacer unit which is a straight-chain or branched alkylene residue, which is unsubstituted, mono-substituted by cyano or halogeno, or poly-substituted by halogeno, having 1 to 24 carbon atoms, wherein one or more of the non-adjacent $CH_2$ groups may independently be replaced by Q, wherein Q has the meaning given above;

Z¹, Z² independently represent a single covalent bond or a spacer unit which is a straight-chain or branched alkylene residue, which is unsubstituted, mono-substituted by cyano or halogeno, or poly-substituted by halogeno, having 1 to 8 carbon atoms, wherein one or more of the non-adjacent $CH_2$ groups may independently be replaced by Q, —N=N— or —CR²=C—CO—, wherein Q and R² have the meaning given above;

P represents a polymerisable group;

m¹, m², m³ independently are 0 or 1; and o is 0 or 1, whereby the sum of the symbols o in B¹ to B⁴ is >0, or at least on polymerisable dichroic dye selected from an azo dye of the formulae IV and V:

R⁴—Ar¹—N=N—Ar²—N=N—Ar³—B¹    IV

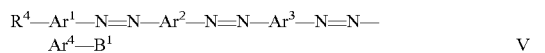

R⁴—Ar¹—N=N—Ar²—N=N—Ar³—N=N—
    Ar⁴—B¹    V wherein

R⁴ represents hydrogen, fluoro, chloro, bromo, cyano, nitro, —NR²R³, a three- to seven-membered cyclic amino group, —CR²=CR³—NO₂, —CR²=CR³—CN, —CR²=C(CN)₂, or a straight chain or branched alkyl residue, which is unsubstituted, mono- or poly-substituted by fluorine having 1-18 carbon atoms, wherein one or more of the non-adjacent $CH_2$ groups may independently be replaced by —O—, —CO—O—, —O—CO—, —NR²—CO—, —CO—NR²—, —NR²—CO—O—, —O—CO—NR²—, —CH=CH—, —C≡C—, —O—CO—O—, wherein R² and R³ independently represent hydrogen or lower alkyl;

Ar¹, Ar², Ar³, Ar⁴ independently of each other are 1,4-phenylene, 1,4- or 1,5-naphthylene optionally substituted by fluorine, chlorine, hydroxy, —NR²R³ or by a straight chain or branched alkyl residue, which is unsubstituted, mono- or poly-substituted by fluorine having 1-12 carbon atoms, wherein one or more of the non-adjacent $CH_2$ groups may independently be replaced by —O—, —CO—O—, —O—CO—, —NR²—CO—, —CO—NR²—, —NR²—CO—O—, —O—CO—NR²—, —CH=CH—, —C≡C—, —O—CO—O—, wherein R² and R³ independently represent hydrogen or lower alkyl; and wherein Ar¹ is also a group of formula a) to c)

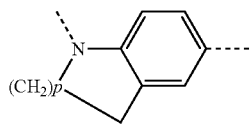

a)

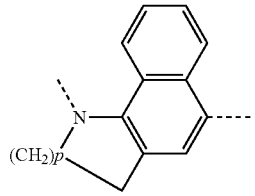

b)

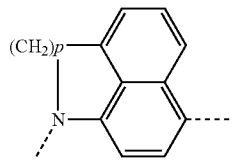

c)

wherein p is an integer of 1 to 3 and R⁴ of formulae IV and V is attached to the nitrogen atom; and B¹ has the meaning given above.

2. A mesogenic, crosslinkable mixture according to claim 1, wherein the aromatic group is an optionally substituted carbocyclic or heterocyclic group comprising five-, six- or ten-membered ring systems.

3. A mesogenic, crosslinkable mixture according to claim 1, wherein the aromatic group is furane, phenyl, pyridine, pyrimidine, naphthalene or tetraline.

4. A mesogenic, crosslinkable mixture according to claim 1, wherein the alicyclic group is a non-aromatic carbocyclic or heterocyclic ring system having 3 to 10 carbon atoms.

5. A mesogenic, crosslinkable mixture according to claim 1, wherein the alicyclic group is cyclopropane, cyclobutane, cyclopentane, cyclopentene, cyclohexane, cyclohexene, cyclohexadiene or decaline.

6. A mesogenic, crosslinkable mixture according to claim 1, wherein the straight-chain or branched alkyl group is selected from the group consisting of methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but-3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent-4-enyloxycarbonyl, cyclohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, decylcarbonyloxy, undecylcarbonyloxy, dodecylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, decylcarbonyl, undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl, 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, and trifluoromethoxy.

7. A mesogenic, crosslinkable mixture according to claim 1, wherein $A^1$, $A^2$ and $A^3$ independently of each other are unsubstituted, saturated five- or six-membered alicyclic rings or six-membered aromatic rings, optionally substituted by fluorine or chlorine or nitro or by a straight chain or branched alkyl residue, which is unsubstituted, mono- or poly-substituted by fluorine having 1-12 carbon atoms, wherein one or more of the non-adjacent $CH_2$ groups may independently be replaced by —O—, —CO—O—, —O—CO—, —$NR^2$—CO—, —CO—$NR^2$—, —$NR^2$—CO—O—, —O—CO—$NR^2$—, —CH═CH—, —C≡C—, —O—CO—O—, wherein $R^2$ represents hydrogen or lower alkyl.

8. A mesogenic, crosslinkable mixture according to claim 1, wherein $A^1$, $A^2$ and $A^3$ are an unsubstituted cyclopentane-1,3-diyl, unsubstituted cyclohexane-1,4-diyl, or 1,4-phenylene, which is unsubstituted, mono- or poly-substituted by fluorine or chlorine or a straight-chain or branched alkyl residue, which is unsubstituted, mono- or poly-substituted by fluorine having 1-12 carbon atoms, wherein one or more of the non-adjacent $CH_2$ groups may independently be replaced by —O—, —CO—O—, —O—CO—, —CH═CH—, —C≡C—.

9. A mesogenic, crosslinkable mixture according to claim 1, wherein $S^1$ and $S^2$ are selected from the group consisting of —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—CO—$NR^2$—, —$(CH_2)_r$—$NR^2$—CO—, —$(CH_2)_r$—$NR^2$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^2$—CO—$(CH_2)_s$—O—, —$(CH_2)_r$—$NR^2$—CO—O—$(CH_2)_s$—O—, —O—$(CH_2)_r$—, —CO—O—$(CH_2)_r$—, —O—CO—$(CH_2)_r$—, —$NR^2$—CO—$(CH_2)_r$—, —CO—$NR^2$—$(CH_2)_r$—, —$NR^2$—$(CH_2)_r$—, —O—$(CH_2)_r$—CO—O—, —O—$(CH_2)_r$—O—CO—, —O—$(CH_2)_r$—CO—$NR^2$—, —O—$(CH_2)_r$—$NR^2$—, —O—$(CH_2)_r$—O—, —O—$(CH_2)_r$—$NR^2$—CO—, —$NR^2$—$(CH_2)_r$—CO—O—, —$NR^2$—$(CH_2)_r$—O—, —$NR^2$—$(CH_2)_r$—$NR^2$—, —$NR^2$—$(CH_2)_r$—O—CO—, —CO—$NR^2$—$(CH_2)_r$—O—, —CO—$NR^2$—$(CH_2)_r$—$NR^2$—, —CO—$NR^2$—$(CH_2)_r$—O—CO—, —O—CO—$(CH_2)_r$—CO—, —O—CO—$(CH_2)_r$—O—, —O—CO—$(CH_2)_r$—$NR^2$, —O—CO—$(CH_2)_r$—CO—O—, —O—CO—$(CH_2)_r$—CO—$NR^2$—, —O—CO—$(CH_2)_r$—$NR^2$—CO—, —O—$(CH_2)_r$—O—$(CH_2)_r$—O—$(CH_2)_s$—, —O—$(CH_2)_r$—CO—O—$(CH_2)_s$—, —O—$(CH_2)_r$—$NR^2$—CO—$(CH_2)_s$—, —O—$(CH_2)_r$—$NR^2$—CO—O—$(CH_2)_s$—, —O—$(CH_2)_r$—CO—O—$(CH_2)_s$—, —O—$(CH_2)_r$—O—$(CH_2)_s$—O—, —O—$(CH_2)_r$—$NR^2$—CO—$(CH_2)_s$—O—, —O—$(CH_2)_r$—$NR^2$—CO—$(CH_2)_s$—O—, —CO—O—$(CH_2)_r$—O—$(CH_2)_s$—O—, wherein r and s are each an integer from 1 to 20, the sum of r+s≦21, wherein $R^2$ represents hydrogen or lower alkyl, and which are attached to the dichroic residue and the polymerisable group, respectively, such that heteroatoms are not directly linked to each other.

10. A mesogenic, crosslinkable mixture according to claim 1, wherein $S^1$ is selected from the group consisting of —$(CH_2)_r$—, —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—$(CH_2)_s$—O—, —$(CH_2)_r$—NH—CO—O—$(CH_2)_s$—O—, —O—$(CH_2)_r$—, —CO—O—$(CH_2)_r$—, —CO—NH—$(CH_2)_r$—, —O—CO—$(CH_2)_r$—, —O—CO—$(CH_2)_r$—CO—O—, —O—$(CH_2)_r$—O—CO—, —O—$(CH_2)_r$—CO—NH—, —O—$(CH_2)_r$—NH—CO—, —CO—O—$(CH_2)_r$—O—, —CO—NH—$(CH_2)_r$—O—, —O—$(CH_2)_r$—O—, —O—$(CH_2)_r$—NH—CO—$(CH_2)_s$—, —O—$(CH_2)_r$—O—$(CH_2)_s$—O—, O—CO—$(CH_2)_r$—O—$(CH_2)_s$—O—, —CO—O—$(CH_2)_r$—O—$(CH_2)_s$—O—, —O—$(CH_2)_r$—NH—CO—$(CH_2)_s$—O—, —O—CO—$(CH_2)_r$—NH—CO—$(CH_2)_s$—O—, wherein r and s are each an integer from 1 to 16, the sum of r+s≦18 and which are attached to the dichroic residue and the polymerisable group, respectively, such that heteroatoms are not directly linked to each other.

11. A mesogenic, crosslinkable mixture according to claim 1, wherein $S^1$ selected from the group comprising —$(CH_2)_r$—, —$(CH_2)_r$—O—, —$(CH_2)_r$—CO—O—, —$(CH_2)_r$—O—CO—, —$(CH_2)_r$—O—$(CH_2)_s$—O—, —$(CH_2)_r$—NH—CO—O—$(CH_2)_s$—O—, and if attached to a carbon atom of the dichroic residue also —O—$(CH_2)_r$—, —CO—O—$(CH_2)_r$—, —O—CO—$(CH_2)_r$—, —O—CO—$(CH_2)_r$—CO—O—, —O—$(CH_2)_r$—O—CO—, —CO—O—$(CH_2)_r$—O—, —O—$(CH_2)_r$—O—, —O—$(CH_2)_r$—O—$(CH_2)_s$—O—, —O—CO—$(CH_2)_r$—O—$(CH_2)_s$—O—, —CO—O—$(CH_2)_r$—O—$(CH_2)_s$—O—, wherein r and s are each an integer from 1 to 12, the sum of r+s≦14 and which are attached to the dichroic residue and the polymerisable group, respectively, such that heteroatoms are not directly linked to each other.

12. A mesogenic, crosslinkable mixture according to claim 1, wherein $S^1$ is selected from the group consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butyleneoxycarbonyl, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexyl, 6-(3-propyleneoxy)hexyl, 6-(3-propyleneoxy)hexyloxy, 6-(3-propyleneiminocarbonyloxy)hexyloxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, and 1,12-dodecylenedioxy.

13. A mesogenic, crosslinkable mixture according to claim 1, wherein $Z^1$ and $Z^2$ groups are a single covalent bond or a straight-chain or branched alkylene residue, which is unsubstituted, mono-substituted or poly-substituted by fluoro, having 1 to 8 carbon atoms, wherein one or more of the non-adjacent $CH_2$ groups may independently be replaced by —O—, —CO—, —CO—O—, —O—CO—, —NR²—CO—, —CO—NR²—, —NR²—CO—O—, —O—CO—NR²—, —CH=CH—, —C≡C—, —O—CO—O—, —N=N—, —CR²=C—CO—, wherein $R^2$ represents hydrogen or lower alkyl.

14. A mesogenic, crosslinkable mixture according to claim 1, wherein $Z^1$ and $Z^2$ groups are a single covalent bond or a straight-chain or branched alkylene residue, having 1 to 6 carbon atoms, wherein one or more of the non-adjacent $CH_2$ groups may independently be replaced by —O—, —CO—O—, —O—CO—, —CH=CH—, —C≡C—, —O—CO—O—, —N=N—, —CR²=C—CO—, wherein $R^2$ represents hydrogen or lower alkyl.

15. A mesogenic, crosslinkable mixture according to claim 1, wherein $Z^1$ and $Z^2$ groups are a single covalent bond or a straight-chain or branched alkylene residue, having 1 to 4 carbon atoms, wherein one or two of the non-adjacent $CH_2$ groups may independently be replaced by —O—, —CO—O—, —O—CO—, —N=N—.

16. A mesogenic, crosslinkable mixture according to claim 1, wherein the polymerisable groups P are selected from the group consisting of $CH_2$=CW—, $CH_2$=CW—COO—, $CH_2$=CH—CO—NH—, $CH_2$=C(Ph)-CO—NH—, $CH_2$=CH—O—, $CH_2$=CH—OOC—, Ph-CH=CH—, $CH_2$=CH-Ph-, $CH_2$=CH-Ph-O—, $R^3$-Ph-CH=CH—COO—, $R^3$—OOC—CH=CH-Ph-O—, and N-maleinimidyl, wherein W is hydrogen, chloro or methyl,
$R^3$ is lower alkyl or lower alkoxy,
Ph- is phenyl, and
-Ph- is 1,4-phenylene.

17. A mesogenic, crosslinkable mixture according to claim 1, wherein the polymerisable groups P are $CH_2$=CW—, $CH_2$=CW—COO—, $CH_2$=CH—O— wherein W is hydrogen or methyl.

18. A mesogenic, crosslinkable mixture according to claim 1, wherein the number of rings in substructure II expressed by $m^1+m^2+m^3$ is $\leq 2$.

19. A mesogenic, crosslinkable mixture according to claim 1 further comprising isotropic compounds comprising two or more polymerisable groups.

20. A mesogenic, crosslinkable mixture according to claim 1 further comprising additives.

21. A mesogenic, crosslinkable mixture according to claim 1 comprising one to four dichroic dyes of formulae IV, V, VI, VII, VIII, IX, X and at least two polymerisable liquid crystals each comprising two polymerisable groups.

22. A mesogenic, crosslinkable mixture according to claim 1, wherein the total content of dichroic dyes is from 0.1 to 50% wt.

23. A mesogenic, crosslinkable mixture according to claim 1, wherein the total content of dichroic dyes is from 0.5 to 30% wt.

24. A mesogenic, crosslinkable mixture according to claim 1, wherein the total content the dichroic dyes is from 0.5 to 20% wt.

25. A mesogenic, crosslinkable mixture according to claim 1, wherein $R^4$ represents hydrogen, chloro, cyano, nitro, —NR²R³,1-piperidyl-1-pyrrolidyl or a straight chain or branched alkyl residue, which is unsubstituted, having 1-12 carbon atoms, wherein one or two of the non-adjacent $CH_2$ groups may independently be replaced by —O—, —CO—O—, —O—CO—, —CH=CH—, wherein $R^2$ and $R^3$ independently represent hydrogen or lower alkyl.

26. A mesogenic, crosslinkable mixture according to claim 1, wherein $Ar^1$ to $Ar^4$ of formulae IV and V, independently of each other, are 1,4-phenylene or 1,4-naphthylene optionally substituted by chlorine, hydroxy, —NR²R³ or by a straight chain or branched alkyl residue, which is unsubstituted, having 1-12 carbon atoms, wherein one or two of the non-adjacent $CH_2$ groups may independently be replaced by —O—, —CO—O—, —O—CO—, —CH=CH—, wherein $R^2$ and $R^3$ independently represent hydrogen or lower alkyl; and wherein $Ar^1$ additionally is a group of formula a) to c).

27. A mesogenic, crosslinkable mixture according to claim 1, wherein the dichroic dye of formula IV comprises zero or one 1,4-naphthylene unit.

28. A mesogenic, crosslinkable mixture according to claim 1, wherein the dichroic dye of formula V comprises zero, one or two 1,4-naphthylene units.

29. A mesogenic, crosslinkable mixture according to claim 1 comprising dyes of formula VI, VII, VIII, IX or X having one or two of the groups $B^1$ to $B^4$.

30. A mesogenic, crosslinkable mixture according to claim 1 wherein the dichroic dye is an anthraquinone of the formula VI, VII or X.

31. A dichroic dye of the formulae VII-X:

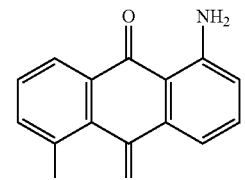

VII

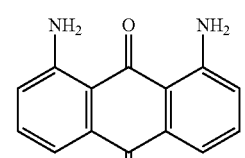

VIII

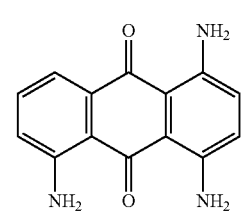

IX

-continued

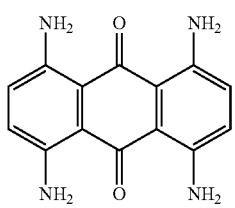

X comprising two of $B^1$ to $B^4$,
wherein one to four hydrogen atoms are substituted by $B^1$ to $B^4$ either at carbon or nitrogen atoms, and wherein $B^1$ to $B^4$ represent a group of substructure II

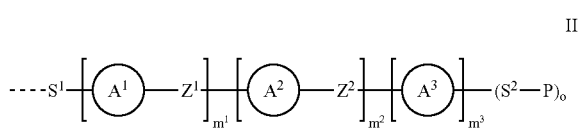

II wherein the broken line symbolizes the linkage to a dichroic residue and wherein:
$A^1$, $A^2$, $A^3$ each independently represent an aromatic or alicyclic group, which is unsubstituted or substituted by fluorine, chlorine, cyano, nitro, or a straight-chain or branched alkyl residue, which is unsubstituted, mono-substituted by cyano or halogeno, or poly-substituted by halogeno, having 1 to 18 carbon atoms, and wherein one or more of the non-adjacent $CH_2$ groups may independently be replaced by Q, whereby Q represents —O—, —CO—, —CO—O—, —O—CO—, —Si$(CH_3)_2$—O—Si$(CH_3)_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, and $R^2$ represents hydrogen or straight-chain or branched $C_1$-$C_6$ alkyl;
$S^1$, $S^2$ represent a single covalent bond or a spacer unit which is a straight-chain or branched alkylene residue, which is unsubstituted, mono-substituted by cyano or halogeno, or poly-substituted by halogeno, having 1 to 24 carbon atoms, wherein one or more of the non-adjacent $CH_2$ groups may independently be replaced by Q, wherein Q has the meaning given above;
$Z^1$, $Z^2$ independently a covalent bond or a spacer which is a straight-chain or branched alkylene residue, which is unsubstituted, mono-substituted by cyano or halogeno, or poly-substituted by halogeno, having 1 to 8 carbon atoms, wherein one or more of the non-adjacent $CR_2$ groups may independently be replaced by Q, —N=N— or —$CR^2$=C—CO—, wherein Q and $R^2$ have the meaning given above;
$m^1$, $m^2$, $m^3$ independently are 0 or 1;
o is 0 or 1, whereby the sum of the symbols o in $B^1$ to $B^4$ is >0; and
P represents $CH_2$=CW—, $CH_2$=CW—COO—, $CH_2CH$—CO—NH—, $CH_2$=C(Ph)CO—NH—, $CH_2$=CH—O—, $CH_2$=CH—OOC—, Ph-CH=CH—, $CH_2$=CH-Ph—O—, $R^3$-Ph-CH=CH—COO—, $R^3$—OOC—CH=CH-Ph—O—, N-maleinimidyl,
wherein
W is hydrogen, chloro or methyl,
$R^3$ is lower alkyl or lower alkoxy,
Ph- is phenyl, and
-Ph- is 1,4-phenylene,
with the provision that at most one of $B^1$ to $B^4$ is attached to the same nitrogen atom.

32. A dichroic dye according to claim 31 of formula VII or X.

33. Liquid crystalline polymer film formed from a mixture according to claim 1 by polymerisation.

34. Liquid crystalline polymer film according to claim 33, wherein the film is coated with further layers.

35. Process of preparing a liquid crystalline polymer film on a substrate comprising the steps of
(i) preparing a solution of a mixture according to claim 1,
(ii) applying said solution to a support,
(iii) evaporating solvent to obtain a film,
(iv) polymerising said film using UV light to give a cross-linked dichroic liquid crystal film, and
(v) optionally coating said cross-linked dichroic liquid crystal film with other layers.

36. Process according to claim 35, wherein the substrate is a transparent substrate comprising an orientation layer.

37. Process according to claim 36, wherein the transparent substrate is glass or plastic.

38. Process according to claim 36, wherein the orientation layer is rubbed polyimide or polyamide.

39. Process according to claim 36, wherein the orientation layer comprises a photo-orientable material.

40. Multilayer system comprising two or more liquid crystalline polymer layers, wherein at least one of the liquid crystalline polymer layers is a dichroic liquid crystalline polymer layer formed from a mixture according to claim 1 by polymerization.

41. Multilayer system according to claim 40, wherein said layers are covered by at least one other functional layer.

42. A method of using a mesogenic, crosslinkable mixture, comprising producing liquid crystalline polymer films with a mesogenic, crosslinkable mixture according to claim 1.

43. A method of using a mesogenic, crosslinkable mixture, comprising preparing unstructured and structured optical elements and multi-layer systems with a mesogenic, crosslinkable mixture according to claim 1.

44. A method of using a mesogenic, crosslinkable mixture, comprising constructing security devices with a mesogenic, crosslinkable mixture according to claim 1.

45. A method of using a liquid crystalline polymer film, comprising preparing unstructured and structured optical elements and multi-layer systems with a liquid crystalline polymer film formed from a mixture according to claim 1 by polymerisation.

46. A method of using a liquid crystalline polymer film, comprising constructing security devices with a liquid crystalline polymer film formed from a mixture according to claim 1 by polymerisation.

47. Electro-optical or optical component or device or security device comprising a dichroic liquid crystalline polymer film formed from a mixture according to claim 1.

48. A mesogenic, crosslinkable mixture according to claim 1, wherein $R^2$ represents straight-chain or branched $C_1$-$C_3$ alkyl.

49. A dichroic dye according to claim 31, wherein $R^2$ represents straight-chain or branched $C_1$-$C_3$ alkyl.

50. A mesogenic, crosslinkable mixture according to claim 2, wherein the aromatic group is furane, phenyl, pyridine, pyrimidine, naphthalene or tetraline.

51. A mesogenic, crosslinkable mixture according to claim 25, wherein $Ar^1$ to $Ar^4$ formulae IV and V, independently of each other, are 1,4-phenylene or 1,4-naphthylene optionally substituted by chlorine, hydroxy, —NR²R³ or by a straight chain or branched alkyl residue, which is unsubstituted, having 1-12 carbon atoms, wherein one or two of the non-adjacent CH₂ groups may independently be replaced by —O—, —CO—O—, —O—CO—, —CH═CH—, wherein R² and R³ independently represent hydrogen or lower alkyl; and wherein Ar¹ additionally is a group of formula a) to c).

* * * * *